(12) United States Patent
Tyrer et al.

(10) Patent No.: US 11,951,818 B2
(45) Date of Patent: Apr. 9, 2024

(54) GOLF CART FOLDABLE REAR ENCLOSURE

(71) Applicant: Club Pro Manufacturing USA, Inc., Deer Park, NY (US)

(72) Inventors: Stephen E. Tyrer, Deer Park, NY (US); Richard Harris, Pinckney, MI (US)

(73) Assignee: Club Pro Manufacturing USA, Inc., Deer Park, NY (US)

( * ) Notice: Subject to any disclaimer, the term of this patent is extended or adjusted under 35 U.S.C. 154(b) by 0 days.

(21) Appl. No.: 17/893,597

(22) Filed: Aug. 23, 2022

(65) Prior Publication Data
US 2023/0058057 A1   Feb. 23, 2023

Related U.S. Application Data

(60) Provisional application No. 63/235,961, filed on Aug. 23, 2021.

(51) Int. Cl.
*B60J 7/12*        (2006.01)

(52) U.S. Cl.
CPC ..................... *B60J 7/12* (2013.01)

(58) Field of Classification Search
CPC ..... B60J 7/12; B60J 7/1278; B60J 7/10; B60J 7/062; B60J 7/061; B60J 7/1234; B60J 7/20; B60J 11/00; E04H 15/06
USPC ........... 296/100.01, 100.11, 100.16, 100.17, 296/100.18, 100.14, 136.05, 136.06, 102, 296/37.16, 37.7, 107.08, 35.4, 77.1, 79, 296/83, 108; 135/88.01, 88.05, 88.07, 135/88.13, 88.14, 88.09
See application file for complete search history.

(56) References Cited

U.S. PATENT DOCUMENTS

| | | | | |
|---|---|---|---|---|
| 5,058,943 | A * | 10/1991 | Louderback | B60J 7/1278 296/107.09 |
| 6,216,714 | B1 * | 4/2001 | Tucker | E04H 15/06 160/122 |
| 6,220,647 | B1 * | 4/2001 | Winkler | B60J 7/1278 280/DIG. 5 |
| 7,100,662 | B2 * | 9/2006 | Nation | B60J 7/10 160/56 |

(Continued)

*Primary Examiner* — Amy R Weisberg
*Assistant Examiner* — Veronica M Shull
(74) *Attorney, Agent, or Firm* — Hoffmann & Baron, LLP

(57) ABSTRACT

A rearwardly extending golf cart enclosure is disclosed. The golf cart enclosure is movable from a stored position to a deployed position which covers the golf bag storage area of the golf cart. The enclosure includes a plurality of struts which are substantially the same size. The enclosure is mounted to the golf cart rear roof supports via a pair of mounting wings or brackets. The mounting wings include a cam member rotatably mounted to a lower end of the mounting wing. The cam member includes a slot which allows at least one strut to move within the slot as the cam member is rotated to store or deploy the enclosure. The enclosure is mounted to an underside of the golf cart roof such that in the stored position, the enclosure fits underneath the golf cart roof and is protected from the elements or sun by a rear end of the golf cart roof. A metallic member provided on the mounting wing is magnetically coupled to a magnet mounted in the enclosure cover to releasably secure the enclosure in the stored position.

20 Claims, 10 Drawing Sheets

(56) References Cited

U.S. PATENT DOCUMENTS

| | | | | |
|---|---|---|---|---|
| 7,234,753 B2* | 6/2007 | Held | ................... | A63B 55/60 |
| | | | | 135/88.13 |
| 8,069,899 B2* | 12/2011 | Nation | ................... | E04F 10/04 |
| | | | | 160/56 |
| 10,239,393 B2* | 3/2019 | Held | ................... | B60R 9/04 |
| 2006/0163905 A1* | 7/2006 | Held | ................... | B62D 35/001 |
| | | | | 296/102 |
| 2011/0146737 A1* | 6/2011 | Friedman | ................ | E04H 15/06 |
| | | | | 135/88.13 |
| 2014/0292020 A1* | 10/2014 | Gallo | ................... | B60J 7/1295 |
| | | | | 296/116 |

* cited by examiner

GOLF CART FOLDABLE REAR ENCLOSURE

FIELD OF THE INVENTION

This invention relates generally to the field of retractable golf cart canopies for protecting golf bags and clubs stored in the rear portion of a golf cart from rain.

BACKGROUND

A bag cover or foldable rear enclosure is used to protect the golf bag and clubs during a rainstorm. When not in use, during fair weather conditions, the bag cover is folded up and will be referred to in the text below as "stored". During a rainstorm, the bag cover is pulled down and will be referred to in the text below as "deployed". Typically, the bag cover assembly when stored, is at least partially positioned behind the golf cart roof. Since the bag cover assembly is behind the roof, there is a need to close the cover assembly to prevent water ingress. One solution to this problem is to place a zipper along the top side of the assembly to close and protect the cover assembly. In addition, a zipper has been used on the left and right side of the product for the same purpose. However, the zipper is cumbersome and expensive and requires the golfer to zip and unzip the cover assembly to use it. It would be advantageous to eliminate the zipper from the assembly on all three sides of the assembly.

Typically, the bag cover foldable material that is used to cover the golf bag/clubs is supported by rigid struts. These struts can be made from e.g., metal or plastic. It is advantageous to arrange the struts so that they nest when stored. Nesting the struts allows the assembly to occupy the smallest amount of space when stored. Currently, struts are generally nested laterally as shown e.g. in US2005/0172988A1 and US2006/0119129A1. In order to nest struts laterally, they must be progressively more narrow and progressively shorter moving toward the centerline of the vehicle. Manufacturing struts with different dimensions necessarily adds cost and complexity to the manufacturing process. Another feature of the designs in the publications described above is that the struts all pivot about the same axis. Because the struts all pivot about the same axis, they follow the same arc as the bag cover is deployed.

Thus a rearwardly extending foldable canopy that is sturdy, enclosable without the use of zippers, and neatly foldable for storage and easy deployment is desired.

SUMMARY

An embodiment of the invention includes a rear enclosure for a golf cart, the rear enclosure being movable between a stored position and a deployed position covering a golf club bag mounting section on the rear end of the golf cart. The rear enclosure includes a pair of mounting wings or brackets, each wing being adapted to be mounted to a rear roof support member of the golf cart. Each wing further includes at a bottom end thereof a rotatable cam member. At least a first and second U-shaped support strut are provided for supporting a rear enclosure cover. The support struts are mounted to the rotatable cam member such that in the stored position, the struts are positioned in line one in front of the other. The cover is mounted on the at least two struts. In one embodiment, the at least two struts are substantially the same size. In a further embodiment, the rear enclosure includes three struts which, in the stored position, are positioned in line, one in front of the other. The three struts are preferably substantially the same size.

The rotatable cam member includes slots for receiving an end of the struts. When at least three struts are used, at least two of the struts are rotatably mounted to the rotatable cam member such that the at least two struts have different and distinct axes of rotation. In one embodiment, each strut has a different and distinct axis of rotation. Specifically, a first inner strut and second middle strut are rotatably mounted within a slot in the cam member such that as the cam member is rotated from a stored position to a deployed position, the first inner strut and second middle strut also rotate within the slot thereby having different and distinct axes of rotation. A third outer strut is fixedly mounted in a second slot in the cam member so that as the cam member is rotated, the third outer strut rotates with the cam member.

The enclosure cover includes an upper portion extending from the first inner strut to a top edge of the cover and the top edge of the cover is mounted to an underside of the golf cart roof. In one embodiment, a mounting bracket is secured to the underside of the golf cart roof and the top edge of the cover is coupled to the mounting bracket. Preferably, the mounting bracket is elongated and includes a groove and the top edge of the cover includes an insert sewn therein, such that the insert is dimensioned to slide into the groove to secure the top edge of the cover to the underside of the golf cart roof.

In one embodiment, each mounting wing includes a metallic member mounted thereon and the rear enclosure cover includes a magnet affixed to each side of the cover and arranged to magnetically couple to the metallic member when the rear enclosure is in the stored position. The metallic member may be mounted in a groove on an inner side of each mounting wing. In one embodiment, the metallic member is molded directly into the mounting wing during an injection molding process.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE FIGURES

The invention will be described in greater detail below on the basis of exemplary embodiments shown in the accompanying drawings, in which.

DETAILED DESCRIPTION

Figure 1:
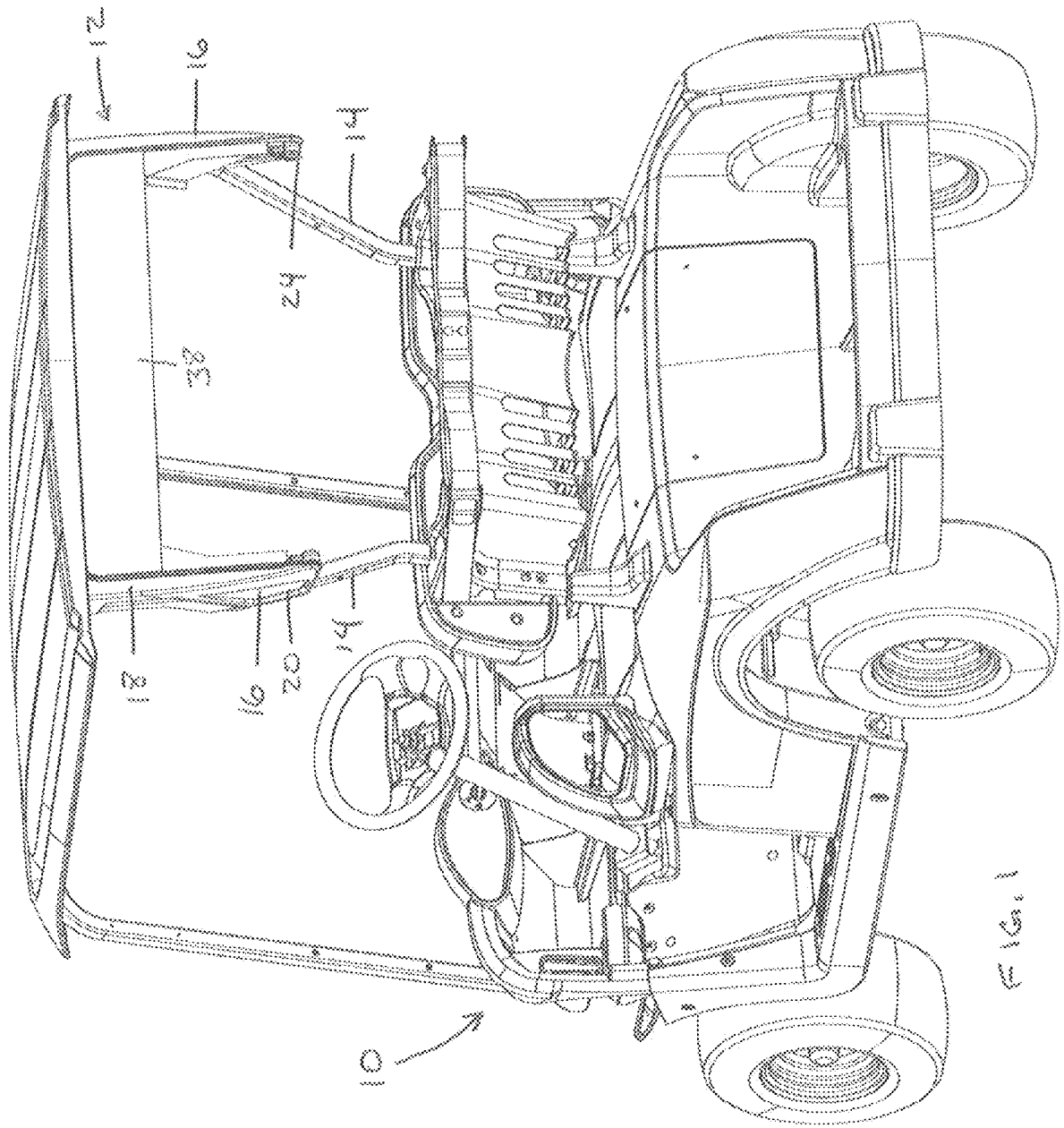
FIG. 1 is a rear perspective in view of a golf cart having a rear enclosure shown in the stored position.
Figure 11:
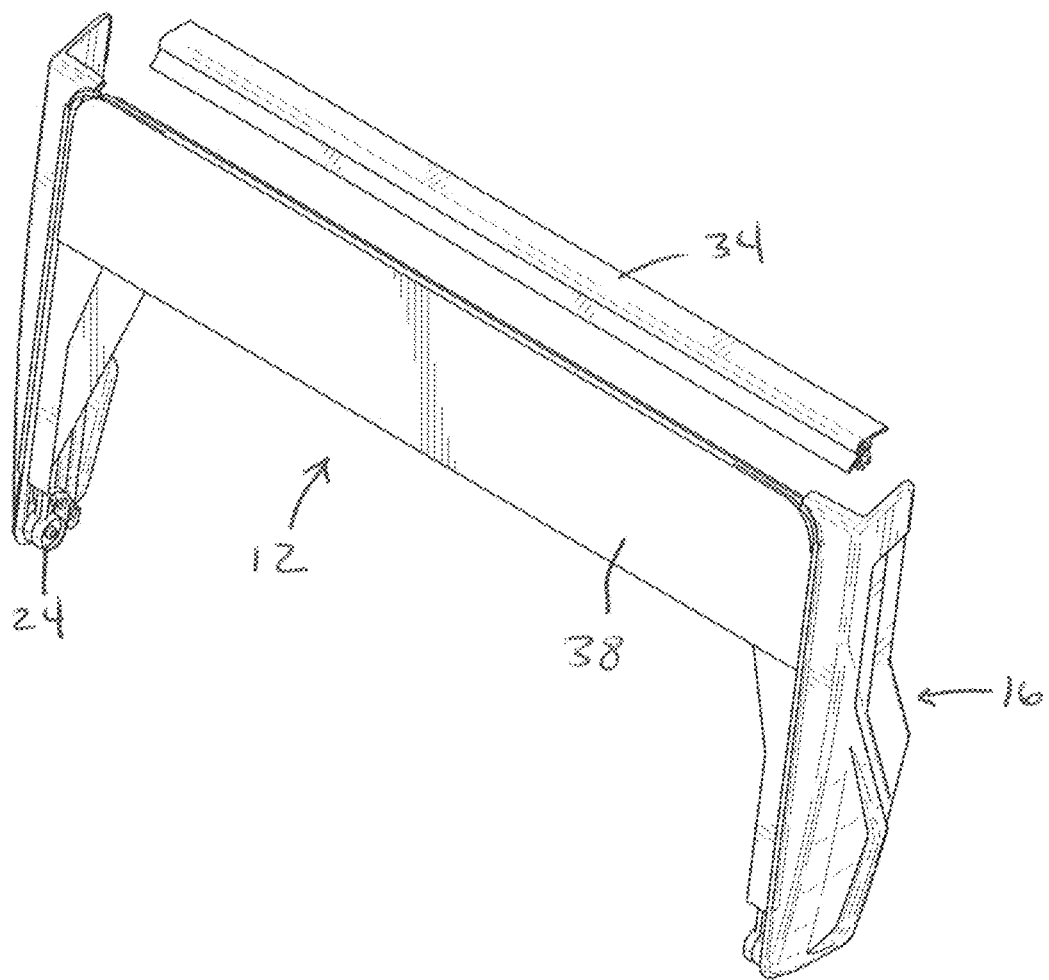
FIG. 11 is a rear perspective view of an embodiment of the rear enclosure in the stored position.

FIGS. 1 and 11 show a rear perspective view of the golf cart 10 including an embodiment of the golf cart rear enclosure 12 mounted to the rear roof support members 14 of a golf cart 10. The golf cart rear enclosure 12 as shown in FIGS. 1 and 11 are in the stored or closed position so that the canopy is folded up upon itself to fit within the confines of the mounting wings 16. The golf cart rear enclosure 12 includes a pair of mounting wings or brackets 16 such that one mounting wing is coupled to each of the golf cart rear roof support members 14.

Figure 10:
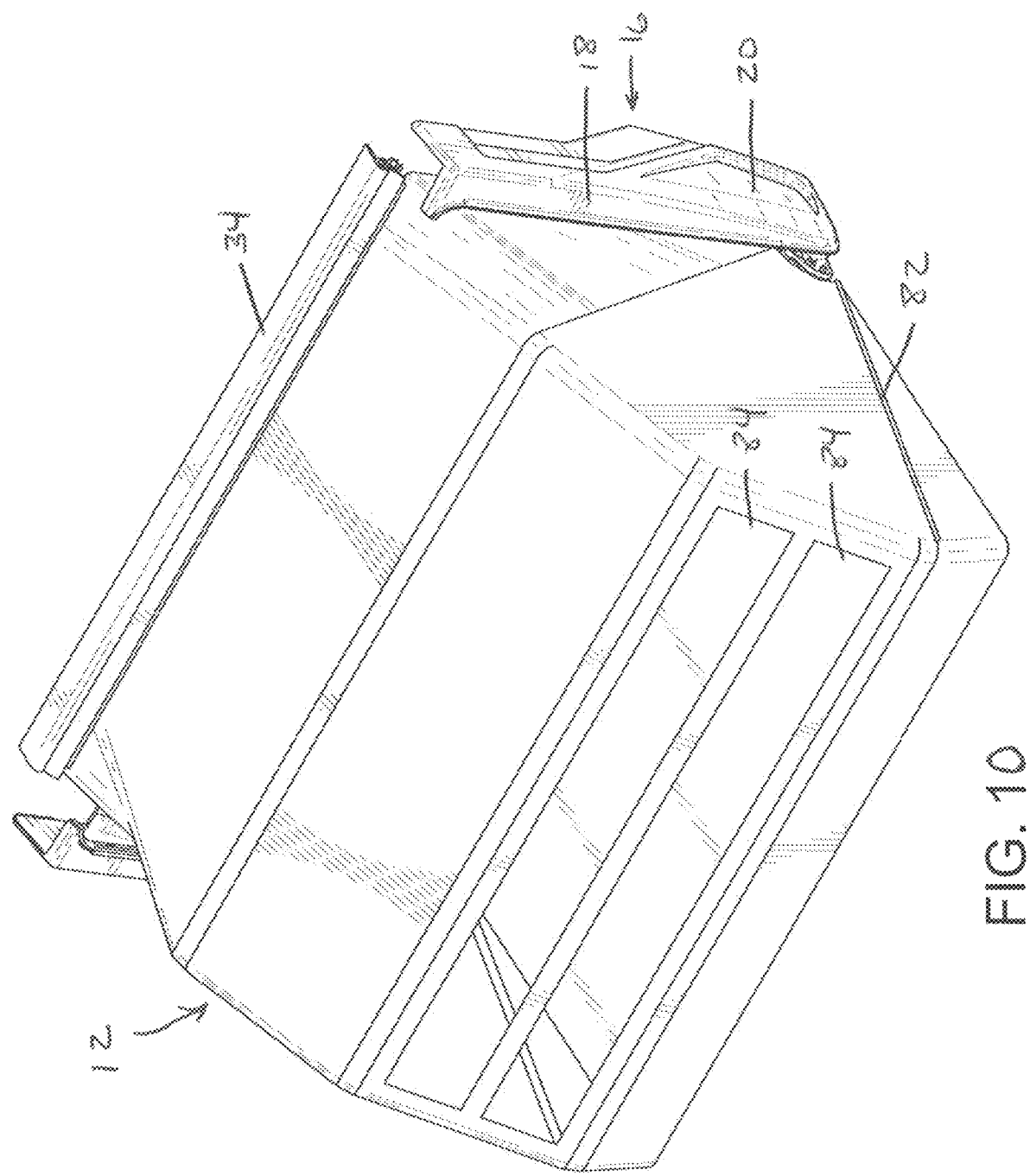
FIG. 10 is a rear perspective view of an embodiment of the rear enclosure in the deployed position.

As shown in FIGS. 1 and 10, each mounting wing 16 is generally L-shaped to include a rear-facing portion 18 which transitions to a side portion 20. Each wing has a narrower side top portion which transitions to a wider side bottom portion. The side facing out from the golf cart includes contours to be aesthetically pleasing and does not include any holes or visible mounting hardware. The inside of the wing 16 provides means for mounting the wing to the golf cart rear roof support member in the form of a channel 22 having opposed channel walls. Within the channel are a pair of spaced apart projections having threaded holes, which do not extend through the wing wall, for receiving mounting bolts. The projections, which may be circular, have threaded holes that may be formed during the molding process or may preferably be metal inserts which are mounted in the projections either during or after the molding process forming the mounting wing. The projections are preferably dimensioned to pass through holes in the rear roof support members for securely mounting the mounting wings thereto via mounting bolts 23. The mounting wings 16 are preferably formed by injection molding and may be made from a wide variety of plastics. The plastic may be colored to match the roof or may be any desired color, such as black to match the rear roof support member.

As shown in FIG. 1, the mounting wings 16 are mounted within the confines of the roof. Since the golf cart rear enclosure folds up into the top portion of the pair of mounting wings and under the rear end of the golf cart roof, the roof provides protection from the elements to keep the rear enclosure 12 dry during a rainstorm and covered from the sun when in the stored position. This eliminates the need for a closeable rear enclosure boot or pouch to close and protect the cover assembly. Such a boot or pouch typically used a zipper placed along a top side of the enclosure. As discussed above, zippers are expensive and oftentimes get stuck or are difficult to open and close, especially when exposed to the elements for prolonged periods of time. As shown in FIG. 1, the rear enclosure formed in accordance with an embodiment of the invention is neatly folded up under the roof and behind the rear-facing portion 18 of the mounting wing 16 when in the stored or closed position.

Figure 2:
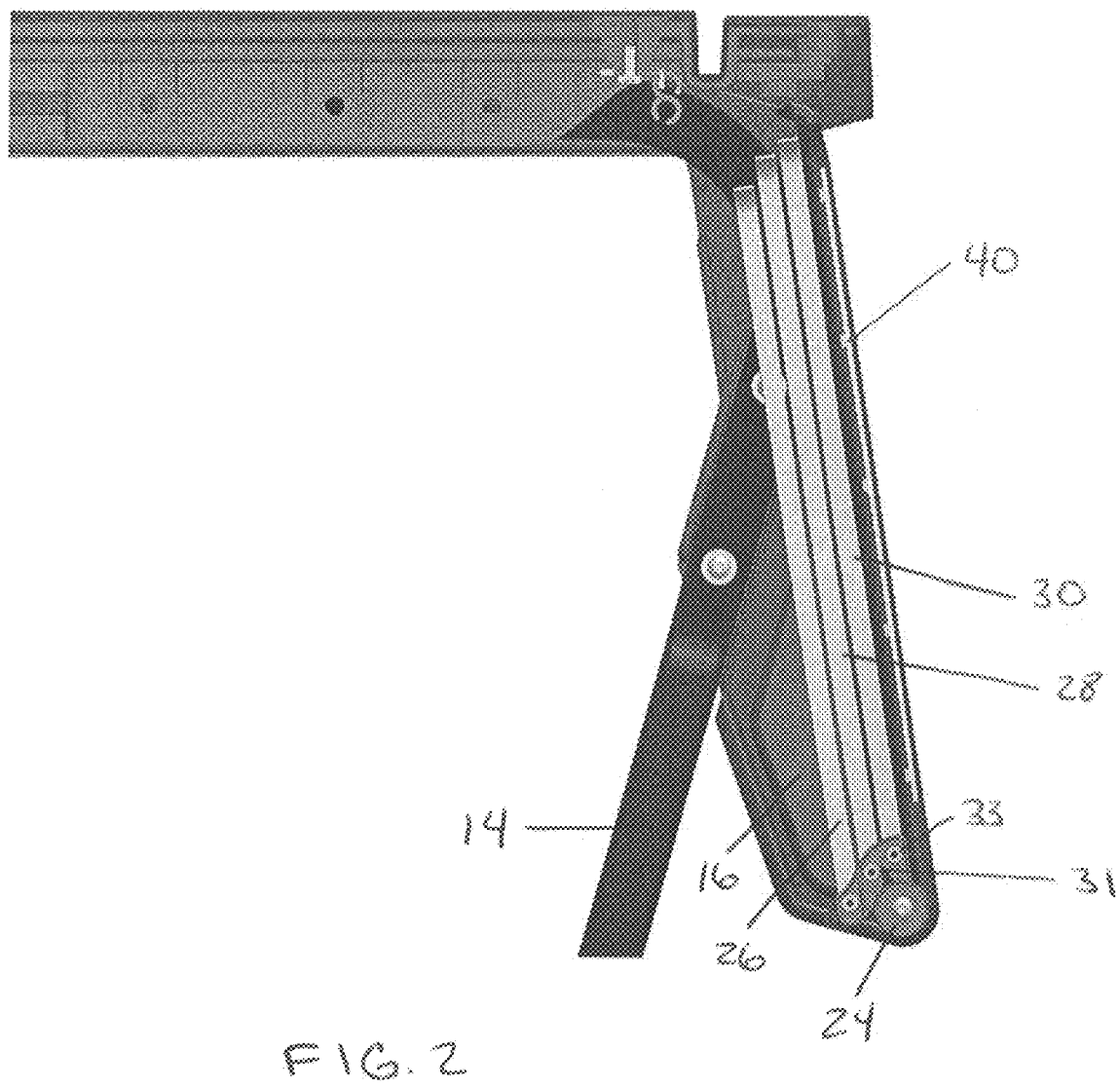
FIG. 2 is a cross-sectional view cut at the center line of the golf cart illustrating a rear enclosure without fabric in the stored position.
Figure 4:
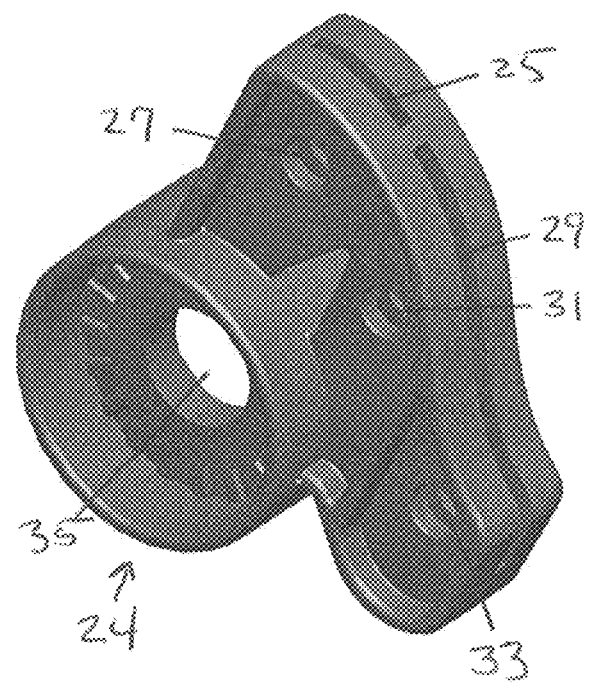
FIG. 4 is front perspective view of the cam member used to mount the struts to the mounting wing.
Figure 5:
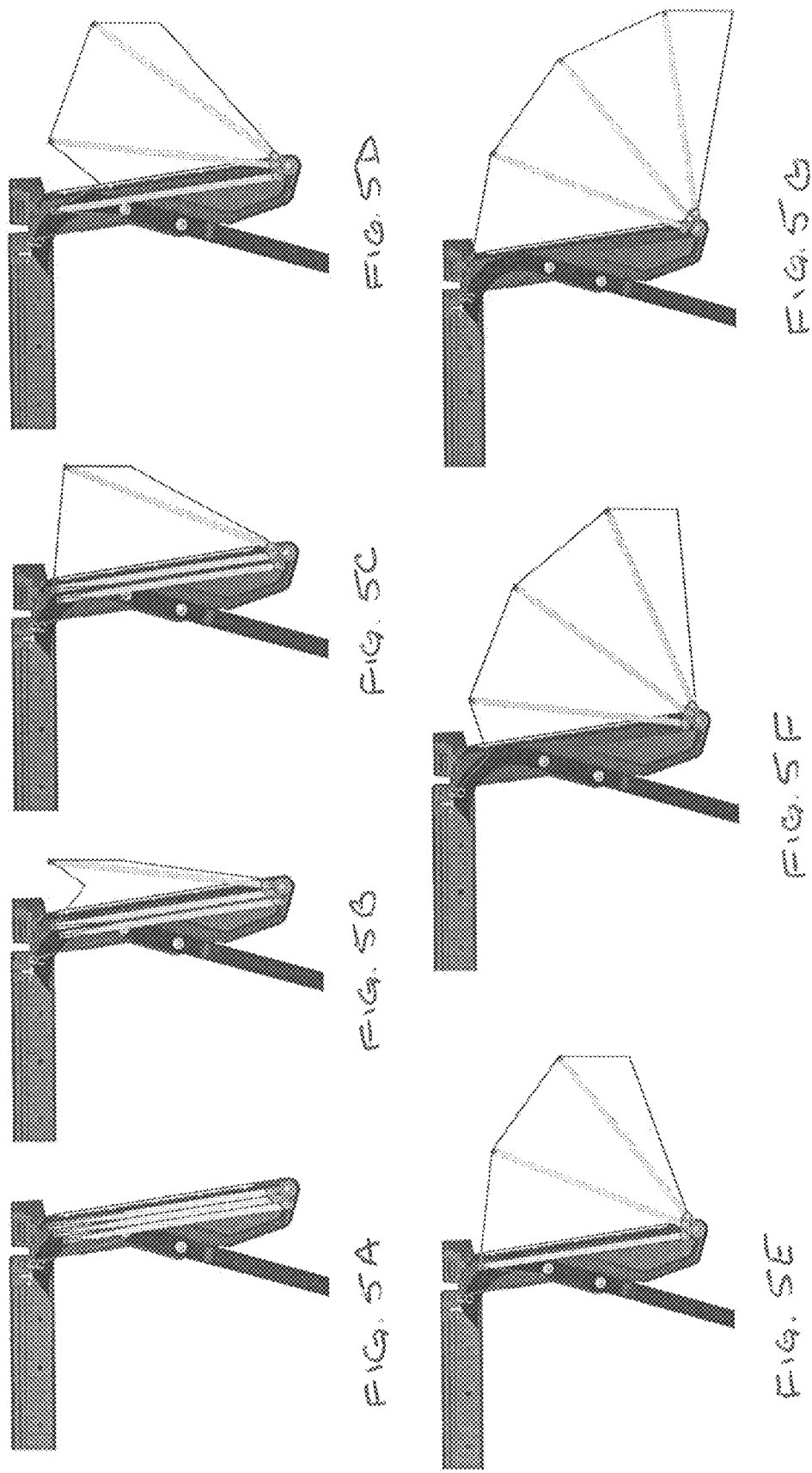
FIGS. 5A-5G illustrate the angle progression of the struts and opening of the rear enclosure fabric cover as the enclosure is moved from the stored position to the deployed position.

FIG. 2 is a cross-sectional view cut at the centerline of the golf cart showing the rear enclosure, without the fabric thereon, in the stored or closed position. As shown in FIG. 2, a cam member 24 is rotatably mounted to a lower outboard corner of the inside wing portion. As shown in FIG. 4, the cam member 24 includes a first elongated slot 25 for receiving an end of a first inner strut 26 and second middle strut 28. The elongated slot 25 includes mounting holes 27, 31 for mounting the first strut 26 and middle strut therein using, e.g. a pop rivet or other similar fastening means such as a bolt and nut. The cam member 24 further includes a slot 29 having mounting hole 33 to fixedly receive a third outer strut 30. Lastly, the third outer strut is fixedly mounted in the slot 29 using mounting hole 33. The cam member 24 further includes a center hole 35 to allow the cam member to be rotatably mounted to the mounting wing 16.

As shown in FIG. 2, the struts are neatly nested in-line from the inner strut 26 to the outer strut 30 such that the three struts are positioned one in front of the next, not laterally as was done in the past. This is accomplished by the cam member 24 providing in-line mounting of the inner and middle struts in the first elongated slot 25 and second slot 29 for mounting the third outer strut thereby providing three distinct pivot points, one for each strut, so that they can stack in line from front to back yet still pivot to place the rear enclosure into an open or deployed position and back to the closed or stored position. The pivot points for the first inner strut 26 and second middle strut 28 the mounting holes 27, 31, located within the elongated slot of the cam member which allows these struts to pivot at different angles as the rear enclosure is deployed or moved back to the stored position.

More specifically, the cam member 24 is rotatably mounted to the mounting wing. The first inner strut 26 are second middle strut 28 are mounted in the elongated slot 25 and rotate independently around mounting holes 27, 31 as well rotate with the cam member 24 relative to the mounting wing 16. The third outer strut 30 is mounted to the cam member in the mounting hole 33 fixedly positioned within slot 29 such that the third outer strut when moved from the stored position to the deployed position, rotates with the cam member 24 relative to the mounting wing 16 to allow for smooth deployment of the enclosure 12. As shown in FIGS. 5A-5G, this arrangement allows each of the three struts to have a different and distinct axis of rotation when moving from stored to deployed position and back to the stored position. Specifically, FIGS. 5A-5G illustrate the progression of the struts and enclosure cover as the enclosure is moved from the stored position in FIG. 5A to the fully deployed position shown in FIG. 5G. As can be seen, the outermost strut 30 first moves out followed by the middle strut 28 and the inner strut 26 until the enclosure is fully opened to cover the golf cart bag storage area. All three struts rotate about a different axis to provide a smooth transition from the stored position to the deployed position.

Figure 6:
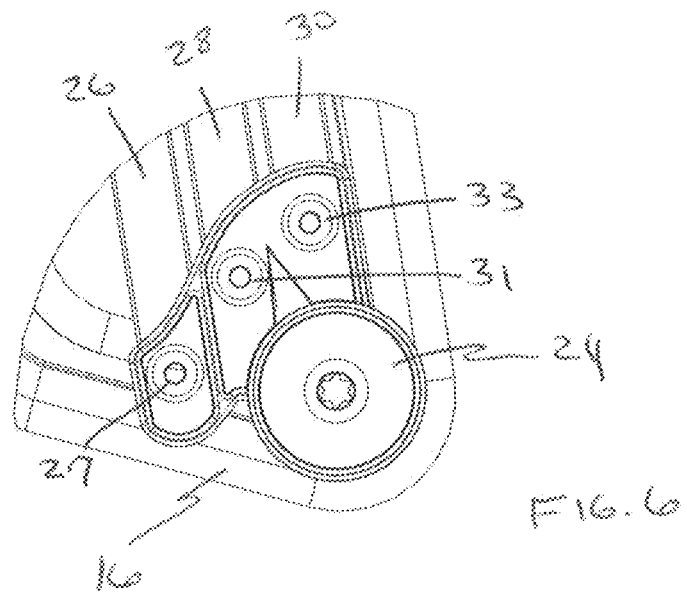
FIG. 6 is an enlarged view of the cam member and strut arrangement when the rear enclosure is in the stored position.
Figure 7:
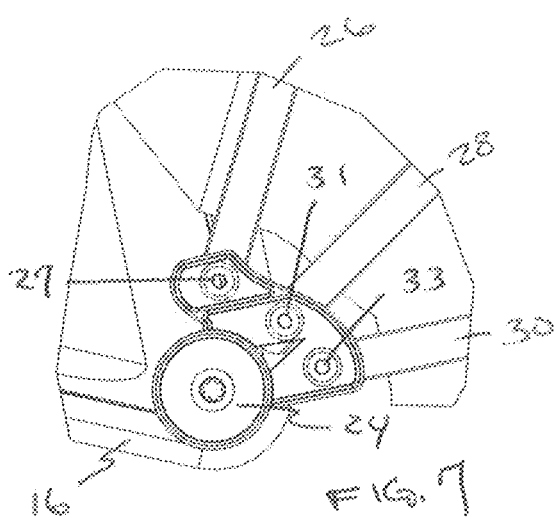
FIG. 7 is an enlarged view of the cam member and strut arrangement when the rear enclosure is in the deployed position.

FIG. 6 is an enlarged view of the cam member 24 and substantially U-shaped support struts 26, 28, 30 with the rear enclosure in the stored position. In this position, the struts are nested in-line and are substantially parallel to one another. FIG. 7 is an enlarged view of the cam member 24 and struts with the rear enclosure in the deployed position. As is clearly evident, the third outer strut 30 fixedly mounted to the slot 29 has been rotated about the axis of rotation of the cam member 24 relative to the mounting wing 16. The middle strut 28 and first inner strut 26 have rotated about different axes of rotation in view of the rotation of the struts 26, 28 about the mounting point, as well as rotation of the cam member 24 relative to the mounting wing 16.

Figure 8:
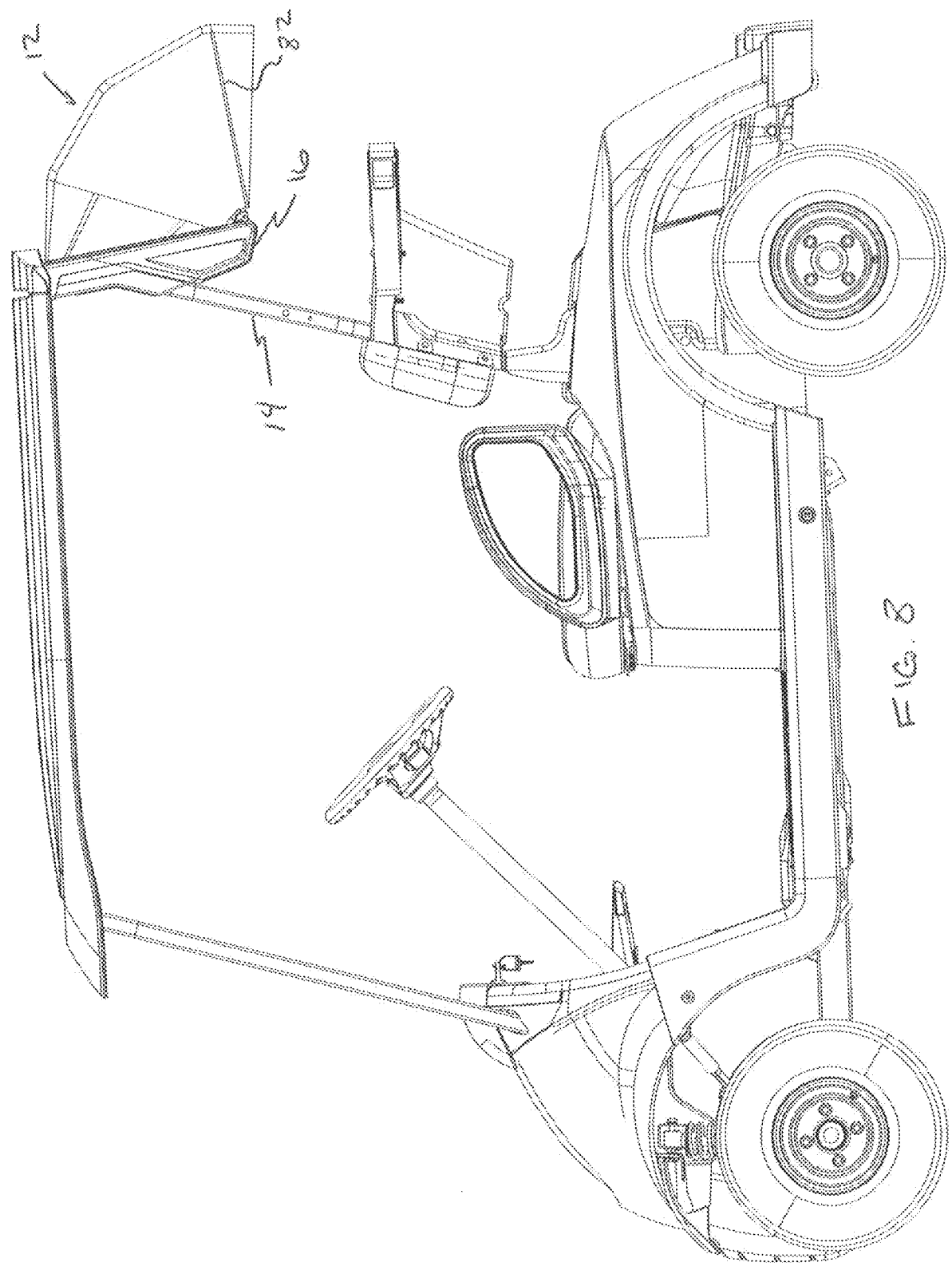
FIG. 8 is a side view of the golf cart illustrating an embodiment of the rear enclosure in the deployed position.
Figure 9:
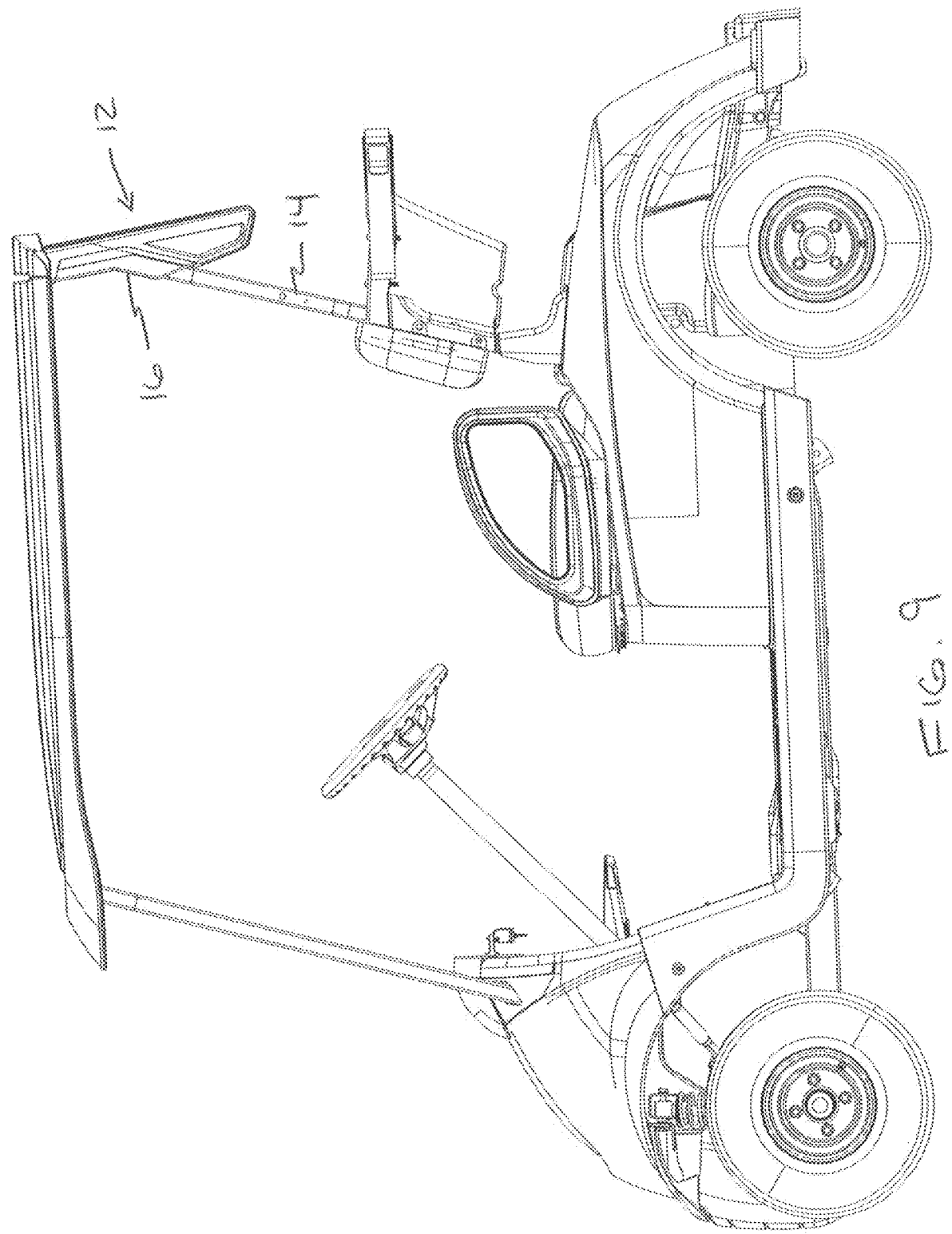
FIG. 9 is a side view of a golf cart illustrating an embodiment of the rear enclosure in the stored position.

FIG. 8 illustrates a side view of a golf cart including one embodiment of a rear enclosure in accordance with the invention in a deployed position. Also shown in the side view is the magnetic strip 82 sewn into the rear enclosure cover along the outside portion thereto in-line with the third outer strut. When moved to the closed position, the magnetic strip 82 magnetically couples to the metal bar or rod mounted to an inner surface of the mounting wings 16 to hold the rear enclosure in the closed position even when the golf cart traverses rough terrain. This coupling arrangement will be discussed in greater detail below. FIG. 9 illustrates a side view of the golf cart shown in FIG. 8 with the rear enclosure 12 in the stored position. As can be seen, the entire enclosure folds up within the profile of the mounting wing so that the enclosure cover is not seen from the side. Only the mounting wing 16 is visible to the user in this view. It should also be noted that the rear enclosure is covered at the top since it folds up under the rear portion of the golf cart roof. Thus, in the stored position, the rear enclosure has a very small profile and is aesthetically pleasing since it appears to have been designed to fit the cart from the factory as opposed to an aftermarket accessory.

As shown in FIG. 2, the in-line fore to aft stacking of the struts is significant since each of the three struts are substantially dimensionally the same. None of the prior art golf cart rear enclosures include a design in which the struts supporting the canopy are all substantially dimensionally the same. By having the struts 26, 28, 30 being the same size, the number of parts required is lessened and less material can be used to form the struts thereby reducing costs and the complexity of the manufacturing process. Another benefit to stacking the struts in-line is that the first inner strut 26 and second middle outer strut 28 are mounted to the cam member 24 so that they pivot about a different axis as the rear enclosure 12 is deployed or moved back to the stored position. The design of the cam member 24 dictates the kinematic motion of the struts as the rear enclosure is moved from the closed to open positions and back to the closed position. Thus, having control over the strut kinematics allows the rear enclosure to be deployed from a position that is entirely covered by the golf cart roof without the struts interfering with the roof.

Figure 3:
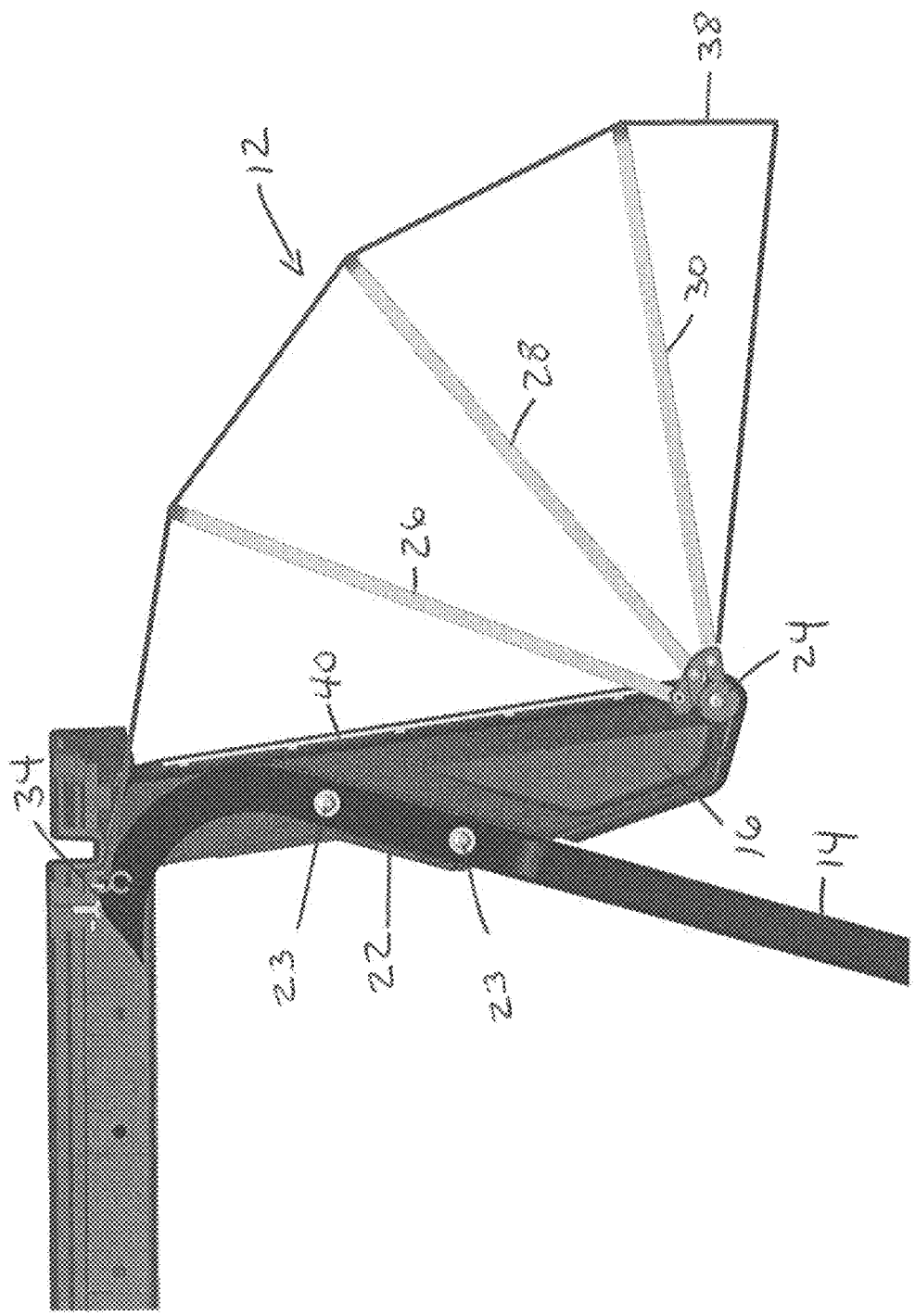
FIG. 3 is a cross-sectional view cut at the center line of the golf cart illustrating a rear enclosure with fabric in the deployed position.

As shown in FIG. 3, the rear enclosure 12 includes a covering preferably made from durable fabric such as those used for awnings and the like which is attached to the frame assembly comprising the mounting wings 16 and rotatable struts 26, 28, 30. As shown in FIG. 3, the rear enclosure is illustrated in the open or deployed position. As shown in FIGS. 3 and 10, the rear enclosure includes a top cover portion 32 which extends from the first inner strut 26 to a mounting bracket 34. The mounting bracket 34 is elongated and extends between the pair of rear roof support members 14. The mounting bracket 34 may be attached to the underside of the golf cart roof by any type of fastener, e.g. a screw, bolt, adhesive, hook and loop fasteners, or the like. As will be appreciated by those skilled in the art, there are many different ways to attach the top edge of cover portion 32 to the mounting bracket 34. By way of example only, the top edge of cover portion 32 may include a magnet sewn therein and the bracket may be made of metal such that the magnet holds the fabric against the metal mounting bracket. Alternatively, the top edge of the cover may be clipped or otherwise fastened to the mounting bracket. As shown in FIG. 3, the mounting bracket 34 may include a substantially circular groove adapted to receive a rigid or semi-rigid piping or insert sewn into the top edge of the cover. Thus, the top edge of the cover including the piping may be slid into the groove and securely held therein. In a further embodiment, the mounting bracket may be eliminated and the top edge of the cover may be directly fastened to the underside of the golf cart roof by e.g. hook and loop fasteners.

When the rear enclosure 12 is in the closed or stored position, it is desirable to have a means for maintaining the rear enclosure in the stored position as the golf cart is being driven typically on bumpy terrain. One method of retaining the rear enclosure in the closed position is to use straps or a zippered boot or cover. In one embodiment of the invention, the rear enclosure is held in the stored position with the use of magnet arrangement. For example, a series of magnets 82 (FIG. 8) are sewn into the rear enclosure cover at both the right and left sides. As shown in FIG. 2, magnets of opposite polarity or, preferably a metal rod 40 is mounted to each of the wings so that when the rear enclosure is folded up to the stored position, the magnets in the sides of the rear enclosure cover 32 are coupled to the magnets or metal rod 40 mounted on the inside of the mounting wings 16 to keep the rear enclosure closed. In one embodiment, in order to accurately position a metal rod on the mounting wing, the metal rod 40 may be placed directly in the mold so that during injection molding of the mounting wing, the metal rod is accurately positioned. Alternatively, a groove may be formed in the mounting wing 16 and a metal rod 40 may be press-fit into the groove after the manufacturing process of the wing. As shown in FIGS. 2 and 8, a metal rod 40 is mounted within the wing and couples with magnets 82 sewn in the rear enclosure cover adjacent to third outer strut 30 to keep the rear enclosure in stored position even when the golf cart is traversing bumpy terrain. More specifically, when the rear enclosure is placed in the stored position, the magnets and metal rod are in proximity and force the enclosure to close automatically. To deploy the rear enclosure, the golfer merely grabs the exposed rear flap or third outer strut and pulls the enclosure out to the deployed position without the need to undo a zipper, snaps or straps required in the prior art enclosures.

As shown in FIGS. 1, 2, 9 and 11, when the rear enclosure is placed in the stored position, the entire enclosure is neatly packaged entirely behind the rear-facing portion of the wings and underneath the golf cart roof. Thus, the roof prevents rain from entering the top of the rear enclosure. As shown in FIGS. 1 and 3, the rear enclosure cover includes a bottom portion or panel 38 which extends below the third outer strut 30. As shown in FIGS. 1 and 11, when the enclosure is moved to the closed position, the bottom panel 38 forms a flat, neat flap to cover the folded up enclosure. Thus, the rear enclosure is effectively closed off from the elements and is neatly stored in a compact arrangement. In addition, placing the stored rear enclosure under the roof provides protection from physical damage. For example, golf carts are frequently driven under low hanging tree limbs that scrape along the roof or side of the cart. If the rear enclosure were placed behind or above the roof, it can be damaged by impact from a tree limb.

As shown in FIG. 10, the rear enclosure may include windows 84 to allow the driver to have better vision to see behind the cart when the enclosure is deployed. The windows may be made from transparent plastic or glass sewn into the rear enclosure.

While the invention has been described in connection with one or more embodiments, it is to be understood that the specific mechanisms and techniques which have been described or shown are for illustrative purposes only to provide a basic understanding of the invention, many modifications may be made to the invention described without deviating from the scope of the invention. Thus the scope of the invention should be determined by the appended claims and their legal equivalents, rather than by the examples given.

What is claimed is:

1. A rear enclosure for a golf cart, the rear enclosure being movable between a stored position and a deployed position covering a golf club bag mounting section on a rear end of the golf cart, the rear enclosure comprising:
   a pair of mounting wings, each wing adapted to be mounted to a rear roof support member of the golf cart, each wing further including at a bottom end thereof a rotatable cam member;
   at least a first and second U-shaped support strut for supporting a rear enclosure cover, the support struts being mounted to the rotatable cam member such that in the stored position, the struts are positioned in line one in front of the other; and
   the cover being mounted on the at least two struts.

2. A rear enclosure for a golf cart according to claim 1, wherein the at least two support struts are substantially the same size.

3. A rear enclosure for a golf cart according to claim 1, wherein the rear enclosure includes three U-shaped support struts which, in the stored position, are positioned in line one in front of the other.

4. A rear enclosure for a golf cart according to claim 3, wherein the three support struts are substantially the same size.

5. A rear enclosure for a golf cart according to claim 1, wherein the rotatable cam member includes slots for receiving an end of the struts, and further wherein at least two of the struts are rotatably mounted to the rotatable cam member such that the at least two struts have different and distinct axes of rotation.

6. A rear enclosure for a golf cart according to claim 2, wherein each strut has a different and distinct axis of rotation.

7. A rear enclosure for a golf cart according to claim 3, wherein an outer strut is fixedly coupled to the cam member and further wherein an inner strut and middle strut are rotatably mounted within a slot in the cam member such that as the cam member is rotated from the stored position to the deployed position, the inner strut and middle strut also rotate within the slot thereby having different and distinct axes of rotation.

8. A rear enclosure for a golf cart according to claim 1, wherein the enclosure cover includes an upper portion extending from the first strut to a top edge of the cover and further wherein the top edge of the cover is mounted to an underside of the golf cart roof.

9. A rear enclosure for a golf cart according to claim 8, further comprising a mounting bracket secured to the underside of the golf cart roof and the top edge of the cover is coupled to the mounting bracket.

10. A rear enclosure for a golf cart according to claim 9, wherein the mounting bracket is elongated and includes a groove and the top edge of the cover includes an insert sewn therein, the insert dimensioned to slide into the groove to secure the top edge of the cover to the underside of the golf cart roof.

11. A rear enclosure for a golf cart according to claim 1, wherein each mounting wing includes a metallic member mounted thereon and further wherein the rear enclosure cover includes at least one magnet affixed to each side of the cover and arranged to magnetically couple to the metallic member when the rear enclosure is in the stored position.

12. A rear enclosure for a golf cart according to claim 11, wherein the metallic member is an elongated bar or rod mounted in a groove on an inner side of each mounting wing.

13. A rear enclosure for a golf cart according to claim 12, wherein the metallic member is molded directly into the mounting wing during an injection molding process.

14. A rear enclosure for a golf cart according to claim 8, wherein in the stored position the enclosure folds up under the rear end of the golf cart roof whereby the golf cart roof provides protection from rain or sun when in the stored position.

15. A rear enclosure for a golf cart according to claim 14, wherein the cover includes a bottom panel extending below an outer strut to faun a flat panel which cover the enclosure in the stored position.

16. A rear enclosure for a golf cart, the rear enclosure being movable between a stored position and a deployed position covering a golf bag holding area on a rear end of the golf cart, the enclosure comprising:
   a pair of mounting brackets, each bracket adapted to be mounted to each rear roof support member of the golf cart, the top of the mounting bracket being positioned under a rear end of the golf cart roof;
   at least a first and second U-shaped support strut for supporting the rear enclosure, the support struts being rotatably mounted to a lower end of the mounting brackets; and
   a cover mounted on the at least two struts wherein a top of the enclosure is mounted to the underside of the golf cart roof such that in the stored position, the enclosure is covered by the golf cart roof, wherein the support struts are substantially the same size and further wherein, in the stored position, the struts are positioned in line such that a first strut is in front of the second strut.

17. A rear enclosure for a golf cart according to claim 16, wherein the rear enclosure includes at least three U-shaped struts, wherein the U-shaped struts are substantially the same size and, in the stored position, the struts are positioned in line one in front of the other.

18. A rear enclosure for a golf cart according to claim 17, wherein each mounting bracket includes a rotatable cam member and the support struts are mounted to the rotatable cam member such that at least two struts have different and distinct axes of rotation.

19. A rear enclosure for a golf cart, the rear enclosure being movable between a stored position and a deployed position covering a golf bag holding area on a rear end of the golf cart, the enclosure comprising:
   a pair of mounting brackets, each bracket adapted to be mounted to each rear roof support member of the golf cart, the top of the mounting bracket being positioned under a rear end of the golf cart roof;
   at least a first and second U-shaped support strut for supporting the rear enclosure, the support struts being rotatably mounted to a lower end of the mounting brackets; and
   a cover mounted on the at least two struts wherein a top of the enclosure is mounted to the underside of the golf cart roof such that in the stored position, the enclosure is covered by the golf cart roof, wherein each mounting bracket includes a metallic member mounted thereon and further wherein the rear enclosure cover includes at least one magnet affixed to each side of the cover and arranged to magnetically couple to the metallic member when the rear enclosure is in the stored position.

20. A rear enclosure for a golf cart according to claim 19, wherein the support struts are substantially the same size and further wherein, in the stored position, the struts are positioned in line such that a first strut is in front of the second strut.

\* \* \* \* \*